United States Patent [19]

Moe et al.

[11] Patent Number: 5,659,851
[45] Date of Patent: Aug. 19, 1997

[54] APPARATUS AND METHOD FOR STEERING AN ENDLESS BELT

[75] Inventors: Edward J. Moe, St. Paul, Minn.; Thomas W. Reeder, Asheville, N.C.

[73] Assignee: Minnesota Mining and Manufacturing Company, St. Paul, Minn.

[21] Appl. No.: 558,247

[22] Filed: Nov. 17, 1995

[51] Int. Cl.⁶ .................................................. G03G 15/00
[52] U.S. Cl. ........................... 399/165; 226/15; 226/170; 226/174; 226/180
[58] Field of Search ........................... 355/212; 198/806, 198/808, 810.01, 810.04; 226/15, 18, 170, 174, 180, 190; 474/122, 123, 124; 399/165

[56] References Cited

U.S. PATENT DOCUMENTS

| | | | |
|---|---|---|---|
| 2,451,394 | 10/1948 | Klein | 198/202 |
| 2,655,252 | 10/1953 | Spurgeon | 198/202 |
| 2,797,794 | 7/1957 | Bradley | 198/202 |
| 3,104,789 | 9/1963 | Fife . | |
| 3,161,283 | 12/1964 | Knab et al. . | |
| 3,244,340 | 4/1966 | Fife et al. . | |
| 3,245,519 | 4/1966 | Reinemann . | |
| 3,342,389 | 9/1967 | Drexler . | |
| 3,407,673 | 10/1968 | Slezak . | |
| 3,500,694 | 3/1970 | Jones et al. | 74/241 |
| 3,518,739 | 7/1970 | Butler . | |
| 3,540,571 | 11/1970 | Morse | 198/202 |
| 3,687,273 | 8/1972 | Macone et al. . | |
| 3,694,068 | 9/1972 | Jordan . | |
| 3,715,027 | 2/1973 | Fujimoto | 198/184 |
| 3,789,552 | 2/1974 | Bradbury et al. . | |
| 3,913,729 | 10/1975 | Andrews . | |
| 3,973,446 | 8/1976 | Vasilantone | 198/202 X |
| 3,974,952 | 8/1976 | Swanke et al. . | |
| 3,993,186 | 11/1976 | Sokolowski | 198/806 |
| 4,027,966 | 6/1977 | Jordan . | |
| 4,170,175 | 10/1979 | Conlon, Jr. . | |
| 4,174,171 | 11/1979 | Hamaker et al. . | |
| 4,178,094 | 12/1979 | Silverberg | 198/811 X |
| 4,196,803 | 4/1980 | Lovett . | |
| 4,221,480 | 9/1980 | Spehrley, Jr. | 198/840 X |
| 4,286,706 | 9/1981 | Castelli et al. . | |
| 4,337,598 | 7/1982 | Barth et al. . | |

FOREIGN PATENT DOCUMENTS

| | | |
|---|---|---|
| 945926 | 4/1974 | Canada . |
| 1130318 | 5/1962 | Germany . |
| 3143937 | 8/1982 | Germany . |
| 494319 | 3/1976 | U.S.S.R. . |
| 636142 | 12/1978 | U.S.S.R. . |
| 701882 | 12/1979 | U.S.S.R. . |
| 787296 | 12/1980 | U.S.S.R. . |
| 829505 | 5/1981 | U.S.S.R. . |
| 1052453 | 11/1983 | U.S.S.R. . |
| 2 182 905 | 11/1986 | United Kingdom . |

OTHER PUBLICATIONS

Research Disclosure No. 33109, "Web Tracking Device With Ramp Support Means", Nov. 1991.

*Primary Examiner*—R. L. Moses
*Attorney, Agent, or Firm*—William K. Weimer

[57] ABSTRACT

An apparatus useful for passively steering an endless belt toward a lateral target belt position while the endless belt is transported by a transporting mechanism. A steering roller contacts the belt inner surface, the steering roller being rotatable about a roller axis and being pivotable about a steering axis, and the steering roller having a first roller end. A carriage supports the steering roller and is pivotable about a steering axis such that the steering roller is pivotable about the steering axis. A first member is positioned adjacent to the first roller end and functionally connected to the carriage. The first member contacts the belt inner surface when the first belt edge extends sufficiently beyond the first roller end. The first member applies greater friction to the endless belt than the steering roller when the belt contacts the first member. The first member is positioned relative to the steering axis such that contact between the first member and the belt causes the first member to apply a first torque to the carriage means about the steering axis.

22 Claims, 4 Drawing Sheets

U.S. PATENT DOCUMENTS

| | | |
|---|---|---|
| 4,344,693 | 8/1982 | Hamaker . |
| 4,397,538 | 8/1983 | Castelli et al. . |
| 4,429,985 | 2/1984 | Yokota ............................ 474/106 X |
| 4,462,676 | 7/1984 | Shimura et al. . |
| 4,483,607 | 11/1984 | Nagayama . |
| 4,527,686 | 7/1985 | Satoh . |
| 4,627,702 | 12/1986 | Anderson ........................ 198/835 X |
| 4,641,770 | 2/1987 | Hediger . |
| 4,657,370 | 4/1987 | Forbes, II et al. . |
| 4,747,810 | 5/1988 | Shepley et al. . |
| 4,893,740 | 1/1990 | Hediger et al. . |
| 4,961,089 | 10/1990 | Jamzadeh ........................ 355/212 X |
| 5,156,261 | 10/1992 | Dorner . |
| 5,157,444 | 10/1992 | Mori et al. ......................... 355/282 |
| 5,174,435 | 12/1992 | Dorner et al. . |
| 5,184,424 | 2/1993 | Miller . |
| 5,225,877 | 7/1993 | Wong . |
| 5,248,027 | 9/1993 | Kluger et al. .................... 198/502.4 |
| 5,276,460 | 1/1994 | Miyajima ......................... 226/15 X |
| 5,365,321 | 11/1994 | Koshimizu et al. .............. 355/212 X |
| 5,369,477 | 11/1994 | Foote et al. . |
| 5,383,006 | 1/1995 | Castelli ............................ 355/212 |
| 5,387,962 | 2/1995 | Castelli et al. .................... 355/212 |
| 5,410,389 | 4/1995 | Poehlein .......................... 355/212 |
| 5,467,171 | 11/1995 | Castelli et al. .................... 355/212 |
| 5,471,289 | 11/1995 | Satoh et al. ...................... 198/806 X |
| 5,479,241 | 12/1995 | Hou et al. ........................ 355/212 |

APPARATUS AND METHOD FOR STEERING AN ENDLESS BELT

FIELD OF THE INVENTION

The present invention relates to apparatuses and methods for steering a belt with a transport mechanism and more particularly to apparatuses and methods for passively steering a belt within a transport mechanism.

BACKGROUND OF THE INVENTION

Endless belts are known to be useful for continuously transporting a material from one point to another. An endless belt is positioned around a set of rollers within a transporting mechanism, at least one of the rollers being driven to transport the belt around a transport loop. The rollers can be cantilever-supported, that is, each roller is being supported at only one end such that the endless belt can slide over the unsupported end for removal and replacement. More typically, the rollers are supported at both ends such that one end support on each of the rollers is removed when the endless belt is installed, replaced, etc.

An endless belt can be of a long, flexible strip of material in which the two ends are joined or seamed. For fabric-based belts, seaming includes stitching the two ends together. For thermoplastic material-based belts, seaming can include thermally bonding the two ends together. Other means for seaming include the use of adhesives and mechanical joints, such as zippers.

A specifically designed endless belt has been used within electrophotographic printers. The belt is made of a photoreceptive material which can electrostatically capture an image when exposed to an image-wise pattern of light at an imaging station. Once exposed, the belt is rotated adjacent to a toning station which applies toner to the belt. The toner is attracted to the electrostatic image within the belt such that the toner takes on substantially the same pattern as that created by the image-wise pattern of light (i.e., a toned image). As the belt rotates, the toned image is transferred by a transfer station to, for example, a blank sheet of paper. The belt is further rotated to a charging station which electrostatically "erases" remnants of the previously created electrostatic image. Further rotated, the belt can be charged to a potential which prepares the belt to capture a subsequent image. A complete rotation of the belt through this transport loop can be continuously and rapidly repeated (charge, expose, tone, transfer, erase, charge, . . . ).

However, a challenge is associated with the use of an endless belt, which is keeping the belt properly aligned on the set of rollers. This challenge is magnified when the material being transported must be transported to a very specific location. Because an endless belt can begin to drift or walk from one lateral position on the rollers to another when one or more of the rollers apply a force unevenly across the width of the belt, steering mechanisms have been developed.

Designed to correct or counteract the drifting of the belt, known steering mechanisms have proven to be ineffective, cost-prohibitive, space-prohibitive, or a combination thereof. One known steering approach involves bending the belt in the plane in which the belt travels. For wider and stiffer belts, this approach can be ineffective.

Another known steering approach involves moving all of the rollers. However, for transport mechanisms which involve applying nip pressure to the belt, for example by an outer pressure roller and an inner back-up roller, steering by moving the inner back-up roller complicates the ability of that mechanism to apply continuous nip pressure.

Another approach for steering involves the use of one or more flared rollers to cause higher tension on one edge of the belt. Creating higher tension on one edge can cause the other edge to be unsupported or less supported which is not practical in particular processes, including certain printing processes. In addition, this approach can result in damage to the belt.

Another approach for maintaining the position of the belt involves rollers having end flanges or other end structures which can contact the edges of the belt. However, this approach can damage the edges of particularly susceptible belts.

Another known steering approach involves actively correcting the position of the belt on the rollers. Active correction systems include sensors, actuators, and control systems that can add to the cost and the space requirement of the steering architecture.

There is a need for a steering approach which is cost-effective and space-effective. In addition, that steering approach should work without the need for end flanges or flared rollers. Furthermore, that steering approach should be work even if a portion of the belt is nipped between two rollers.

SUMMARY OF THE INVENTION

The present invention involves a steering apparatus and method which fill this need. One embodiment includes an apparatus useful for maintaining an endless belt within a lateral target belt position range while the endless belt is transported by a transporting mechanism. The endless belt has a belt inner surface and a first belt edge. The apparatus includes a steering roller contacting the belt inner surface. The steering roller has a first roller end. A carriage supports the steering roller. The carriage is pivotable about a steering axis such that the steering roller is pivotable about the steering axis. A first member is positioned adjacent to the first roller end and functionally connected to the carriage. The first member contacts the belt inner surface when the first belt edge extends sufficiently beyond the first roller end. The first member applies greater friction to the endless belt than the steering roller when the belt contacts the first member. The first member is positioned relative to the steering axis such that contact between the first member and the belt causes the first member to apply a first torque to the carriage about the steering axis.

Another embodiment of the present invention includes an endless belt system. This system includes an endless belt which has a belt inner surface and a first belt edge. A drive roller contacts the endless belt. A belt-steering system includes a steering roller which contacts the belt inner surface. The steering roller has a first roller end. The belt-steering system also includes a carriage for supporting the steering roller. The carriage is pivotable about a steering axis such that the steering roller is pivotable about the steering axis. The belt-steering system also includes a first member positioned adjacent to the first roller end and functionally connected to the carriage. The first member contacts the belt inner surface when the first belt edge extends sufficiently beyond the first roller end. The first member applies greater friction to the endless belt than the steering roller when the belt contacts the first member. The first member is positioned relative to the steering axis such that contact between the first member and the belt causes the first member to apply a first torque to the carriage means about the steering axis.

Another embodiment of the present invention includes an electrophotographic system. This system includes an endless belt which has a first belt edge, a belt inner surface, and a belt outer surface. The belt outer surface includes a photoreceptive substrate. A charging system charges the photoreceptive substrate. An exposure system exposes the photoreceptive substrate to at least one image-wise pattern of radiation which creates at least one electrostatic image on the photoreceptive substrate. A development system develops the at least one electrostatic image to an at least one toned image. A transfer system transfers the toned image to a receptor. A belt-steering system steers the belt and includes a steering roller which contacts the belt inner surface. The steering roller has a first roller end. The belt-steering system includes a carriage for supporting the steering roller. The carriage is pivotable about a steering axis such that the steering roller is pivotable about the steering axis. The belt-steering system includes a first member positioned adjacent to the first roller end and functionally connected to the carriage. The first member contacts the belt inner surface when the first belt edge extends sufficiently beyond the first roller end. The first member applies greater friction to the endless belt than the steering roller when the belt contacts the first member. The first member is positioned relative to the steering axis such that contact between the first member and the belt causes the first member to apply a first torque to the carriage about the steering axis.

Another embodiment of the present invention includes a method useful for steering an endless belt toward a lateral target belt position while the endless belt is transported by a transporting mechanism. The endless belt has a belt inner surface and a first belt edge. The method includes the step of providing a steering roller which contacts the belt inner surface. The steering roller has a first roller end and is rotatable about a roller axis. A carriage supports the steering roller and is pivotable about a steering axis allowing the steering roller to be pivotable about the steering axis. Another step includes providing a first member which is positioned adjacent to the first roller end and functionally connected to the carriage. The first member contacts the belt inner surface when the first belt edge extends sufficiently beyond the first roller end. The first member applies greater friction to the endless belt than the steering roller when contacting the endless belt causing the endless belt to apply a first torque to the carriage about the steering axis.

BRIEF DESCRIPTION OF THE DRAWINGS

The foregoing advantages, construction, and operation of the present invention will become more readily apparent from the following description and accompanying drawings.

DETAILED DESCRIPTION OF PREFERRED EMBODIMENTS

Figure 1:
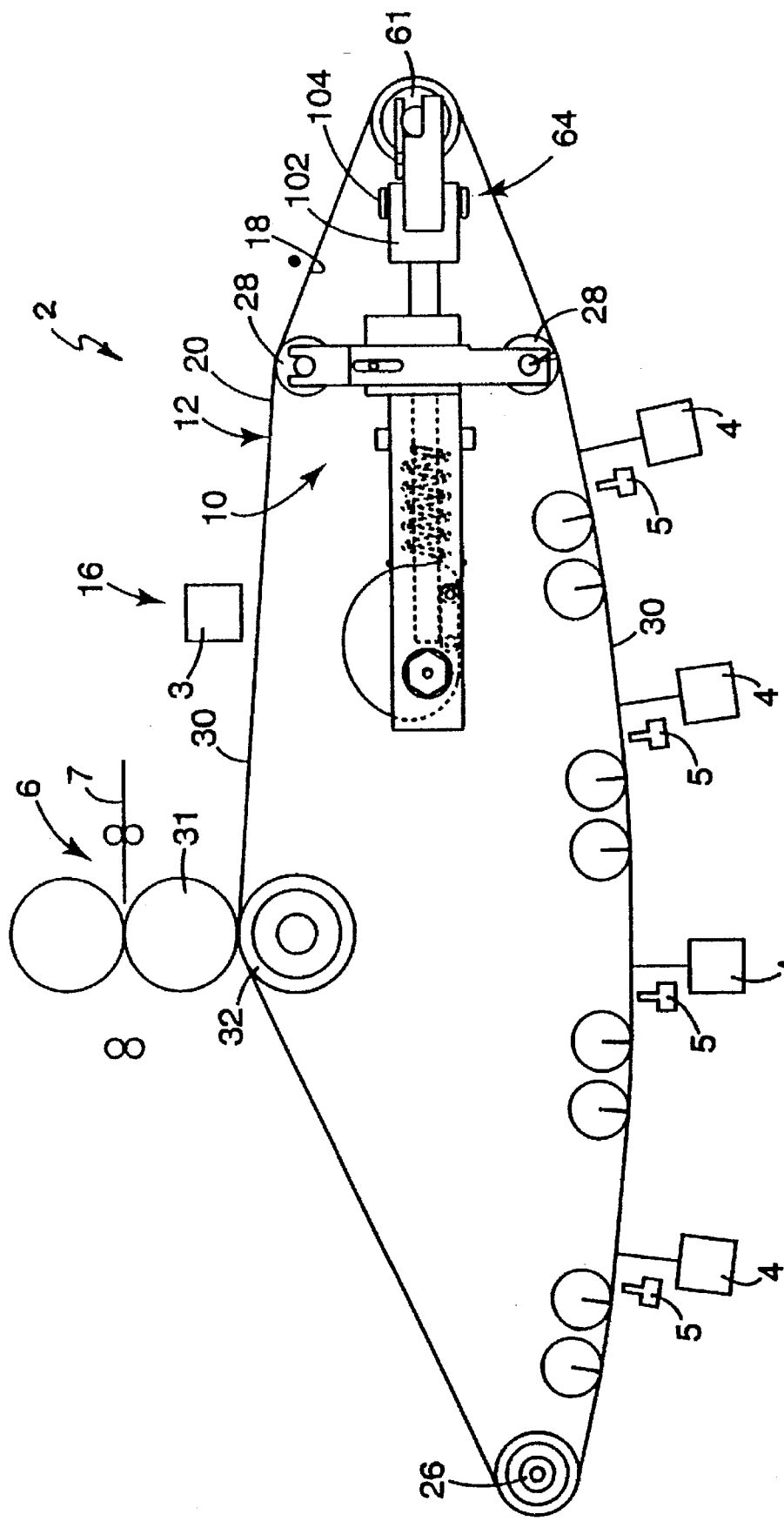
FIG. 1 is a front view of a belt transporting mechanism which includes a steering apparatus in accordance with the present invention.

An embodiment of an electrophotographic system 2 is generally shown in FIG. 1. The electrophotographic system 2 includes a charging system 3, an exposure system 4, a development system 5, a transfer system 6, and a belt steering system or apparatus 10, which includes an endless belt 12.

The endless belt 12 includes a photoreceptive substrate which can be electrostatically charged by the charging system 3. The exposure system 4 exposes the photoreceptive substrate of the belt 12 to at least one image-wise pattern of radiation which creates at least one electrostatic image on the photoreceptive substrate. The development system 5 develops the at least one electrostatic image to an at least one toned image by applying a toner to the photoreceptive substrate of the belt 12.

The term "toner" is generically used to mean a material such as a dry or powder toner or a liquid toner. It is meant to be sufficiently generic to cover materials which are known in the industry as "developers." A preferred example of the toner, however, is the liquid toner specifically covered in a pending U.S. patent application which is identified as 3M Docket No. 52069USA8A, filed by 3M Company, entitled "Liquid Inks Using A Gel Organosal" (Baker et al.). This application is hereby incorporated by reference.

The transfer system 6 transfers the toned image to a receptor 7. Examples of a relevant endless belt and a relevant electrophotographic system are described in greater detail in a pending patent application filed Sep. 29, 1995, assigned to 3M Company, designated as 3M Docket No. 51325USA4A, entitled "A Method and Apparatus for Producing a Multi-Color Image in an Electrophotographic System" (Kellie et al.). This pending patent application is hereby incorporated by reference.

Though useful for steering the endless belt 12 within the electrophotographic system 2, the apparatus 10 shown in FIGS. 1–4 is useful within a variety of other endless belt systems. The apparatus 10 passively controls the position of an endless belt 12 relative to a target belt position on a steering roller 14 while the endless belt 12 is transported by a number of roller making up a transporting mechanism 16. The apparatus 10 is capable of passively controlling the position of the belt 12 when the belt 12 is being transporting both the clockwise and counterclockwise directions, as per the perspective of FIG. 1.

Figure 4:
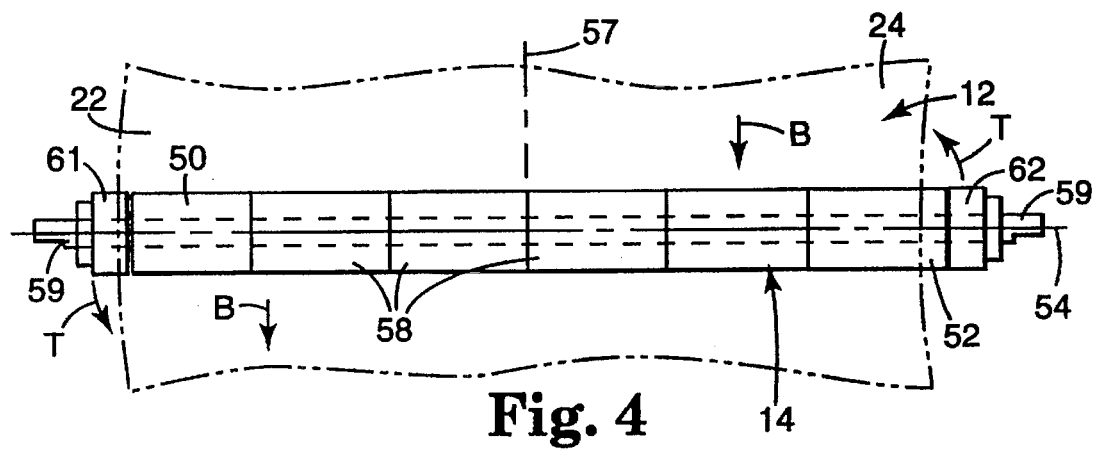
FIG. 4 is a right side view of a portion of the steering apparatus shown in FIGS. 1–3.

When the belt 12 is acted upon by a force which causes the belt 12 to move, or walk, laterally on the steering roller 14, the apparatus 10 can stop the lateral motion and can cause the belt 12 to move laterally back toward the target belt position. The term "target belt position" can mean a particular lateral position on the steering roller 14 or a lateral position range on the steering roller 14. The target belt position can be the position where the belt 12 is roughly centered on the steering roller 14, but this is not necessary. FIG. 4 shows the belt 12 being positioned to the left of center relative to the steering roller 14, possibly due to the application of a lateral force on the belt 12.

The endless belt 12 has an inner belt surface 18 and an outer belt surface 20, a first belt edge 22, and a second belt edge 24. On the belt outer surface 20, the endless belt 12 includes means for electrostatically capturing an image corresponding to an image-wise pattern of radiation.

The belt 12 is shown contacting a number of rollers which constitute the transporting mechanism 16. The belt inner surface 18 is shown contacting a number of inner rollers including the steering roller 14, a drive roller 26, and two stabilizing rollers 28. The drive roller 26 is connected to a drive mechanism (not shown) which drives the endless belt around the transport loop created by the inner rollers. The stabilizing rollers maintain the position of spans 30 of the belt 12 which may be necessary to the imaging process within an electrophotographic apparatus (or other apparatus).

The belt outer surface is shown as contacting an upper nip roller 31 and a lower nip roller 32, components of the transfer system 6. The upper and lower nip rollers 31, 32 can apply nip pressure to the belt 12 to transfer toner from the belt 12 to the upper nip roller 31. Within an imaging apparatus, such as the electrophotographic apparatus 2, still other rollers (not shown) can contact the belt inner and outer surfaces 18, 20 and can apply nip pressure to the belt 12. Uneven nip pressure, like belt non-squareness and roller misalignment, can cause the belt 12 to walk laterally on the inner rollers.

The endless belt 12 can be relatively inelastic and relatively wide and still passively steered by the apparatus 10. One embodiment of the belt 12 is polyester film-based (0.004-inch thick (0.010-centimeter)). The circumference of the belt 12 is between approximately 24 and 40 inches (approximately 61 and 102 centimeters). The width of the belt 12 is between approximately 9.5 and 14 inches (approximate 24 and 36 centimeters). The width of the belt 12 can be the same as the width of the steering roller 14, although it could be narrower or wider. The belt length-to-width ratio is typically between approximately 2.5 and 3.5. The modulus of the belt 12 is approximately 450,000 pounds per square inch ($3.1 \times 10^9$ Newtons per square meter).

Figure 2:
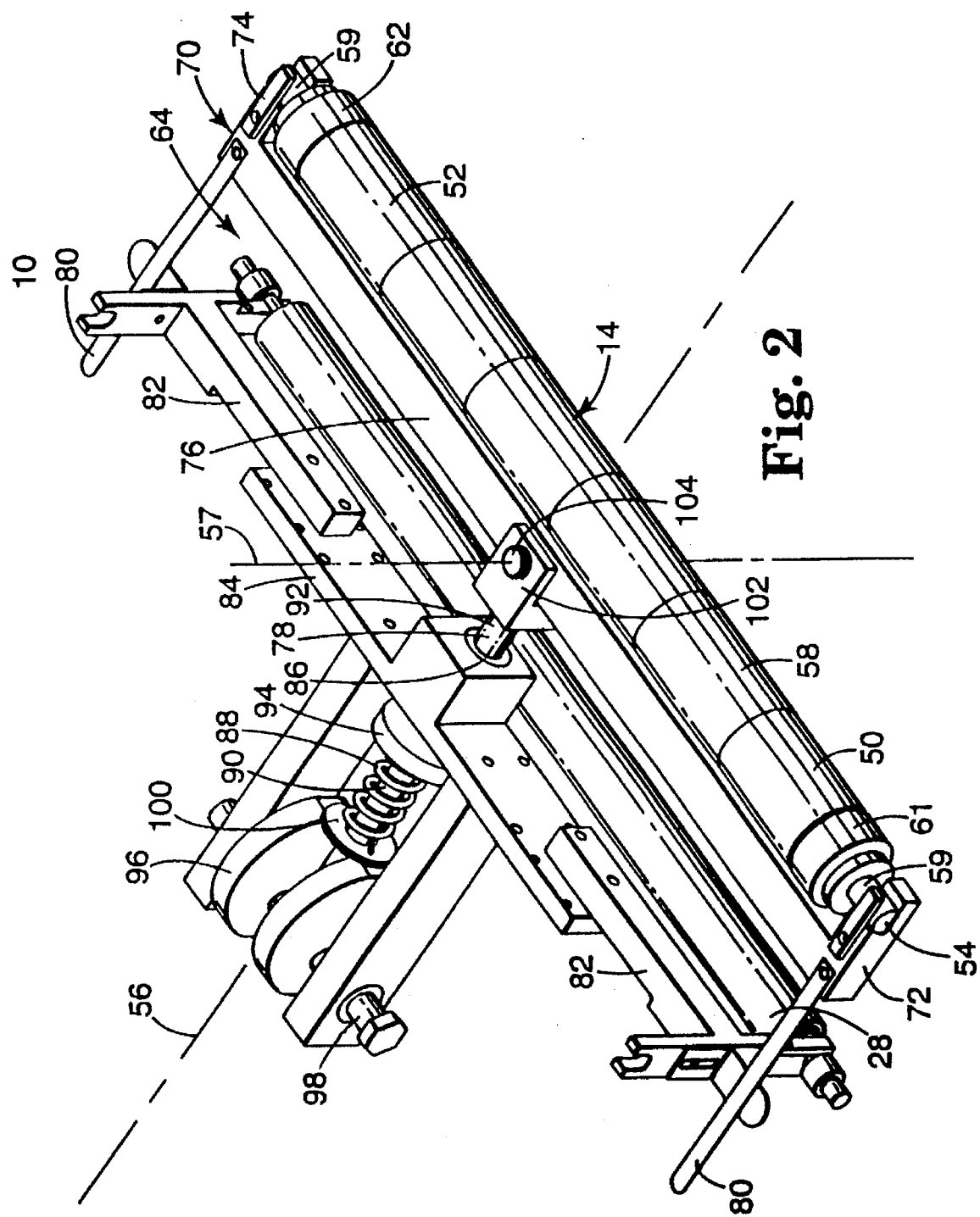
FIG. 2 is an isometric view of the steering apparatus shown in FIG. 1.

The steering roller 14 includes a roller first end 50 and a roller second end 52. The steering roller 14 is shown in FIG. 2 as being cylindrical in shape and rotatable about a roller axis 54, and being pivotable about a steering axis 56 and about a tension-balancing axis 57. The roller axis 54 is shown as being perpendicular to the steering axis 56 and the tension-balancing axis 57. The roller axis 54 is shown as intersecting the steering axis 56 (coplanar), but not intersecting the tension-balancing axis 57 (non-coplanar). This relationship of the axes 54, 56, 57 may be preferred, but other relationships are envisioned.

The steering roller 14 is shown as including more than one cylindrical collar 58 which ride and rotate on an internal dead shaft 59. While the steering roller 14 can be made of one cylindrical collar 58, a plurality of collars 58 results in reduced rotational drag being applied to the belt 12 by the steering roller 14 when the steering roller 14 pivots sufficiently about the steering axis 56. Another embodiment of the steering roller 14B (shown in FIG. 6, and discussed further below) could include a single rotating, cylindrical member which is supported at its ends with roller bearings 60B.

Figure 3:
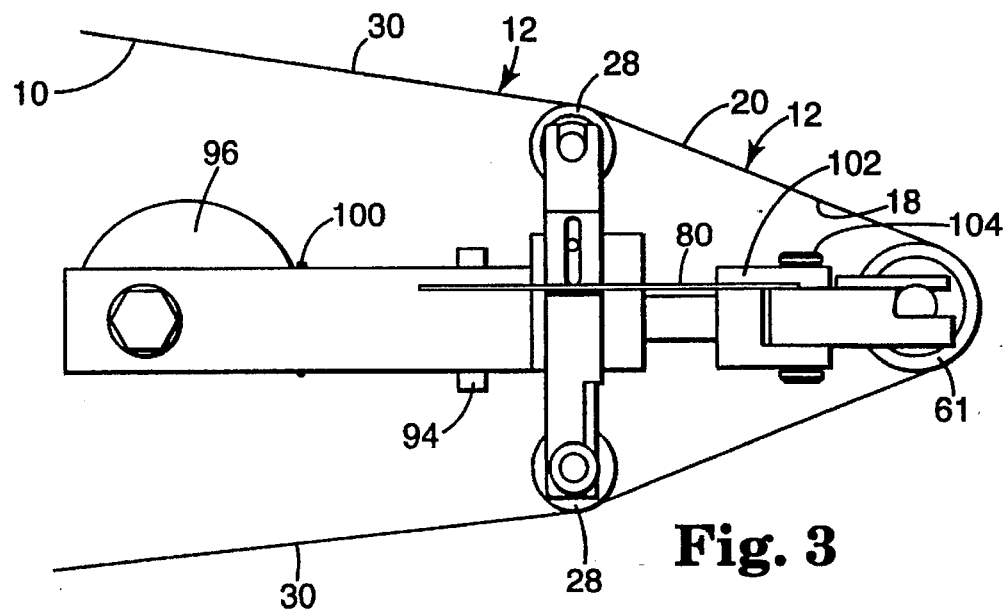
FIG. 3 is a front view of the steering apparatus shown in FIGS. 1 and 2.

A first member 61 is positioned adjacent to the first roller end 50 and a second member 62 is positioned adjacent to the second roller end 52. As shown in FIG. 3, the first member 61 contacts the belt inner surface when the endless belt moves or walks from the target belt position and the first belt edge 18 extends sufficiently beyond the first roller end 50. Conversely, the second member 62 contacts the belt inner surface when the endless belt moves or walks from the target belt position and the second belt edge 20 extends sufficiently beyond the second roller end 52. The inclusion of both the first and the second members 60, 62 allows for a bi-lateral belt steering capability. Another embodiment of the apparatus 10 could including only one of the two members 60, 62 and allow for a unilateral belt steering capability.

FIGS. 2 and 4 show the first and second members 61, 62 as being cylindrical in shape and having an outer diameter which is approximately the same as the outer diameter of the steering roller 14. The belt 12 is shown as having moved laterally to contact the first member 61. Due to the transport direction of the belt (indicated by arrow B) and due to the position of the first member 61 relative to the steering axis 56, Arrow T indicates the direction of the torque that is applied by the belt 12 to the carriage 70. The creation of this torque is described later within this disclosure.

Figure 5:
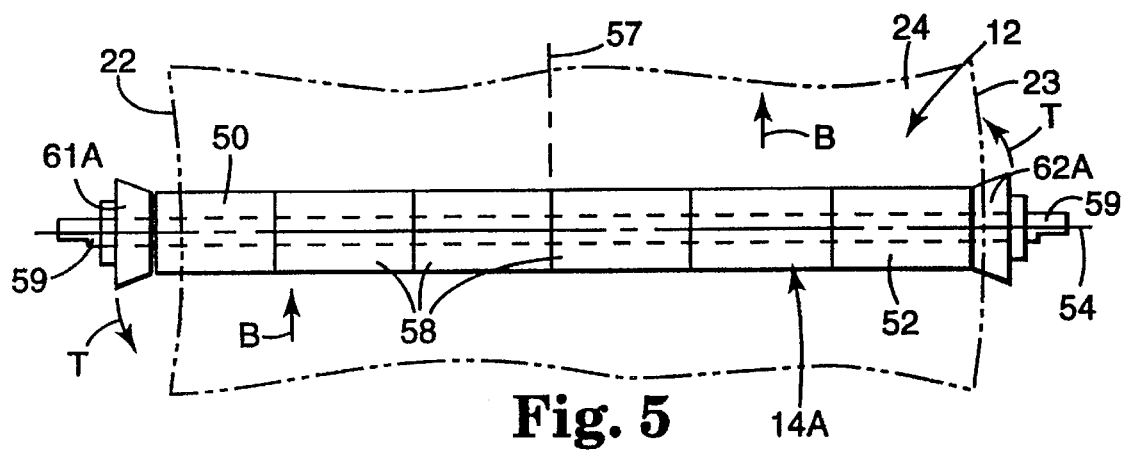
FIG. 5 is a right side view of an alternative embodiment of the portion of the steering apparatus shown in FIG. 4.

FIG. 5 shows another embodiment of the first and second members 61A, 62A. In this embodiment, the first and second members 61A, 62A are frustoconical in shape, rather than cylindrical. The outer diameter of the first and second members 61A, 62A adjacent to the steering roller 14A can be smaller than the outer diameter of the steering roller 14A such that the belt first and second edges 22A, 24A do not contact this portion of the first and second members 61A, 62A.

Because of the frustoconical shape, the outer diameter of the first and second members 61A, 62A at the opposite end of the first and second members 61A, 62A is larger than the outer diameter of the steering roller 14. Consequently, the belt 12A contacts the first member 61A or the second member 62A after sufficiently walking beyond the first roller end 50A or the second roller end 52A, respectively. This approach minimizes the chance of either first belt edge 22A or the second belt edge 24A contacting and being damaged by the vertical face of the first member 61A or the second member 62A, respectively. In addition, the increase in the outer diameter of the first and second members 61A, 62A is kept sufficiently small to not create a high tension on the belt edges 21A, 22A, thereby further minimizing the chances of damaging the belt 12 (i.e., avoiding the problem caused by a flared steering roller).

FIG. 5 also shows the belt 12 as having moved laterally to contact the second member 62A and as being transported in an opposite direction to that shown in FIG. 4. Due to the transport direction B of the belt 12 and the position of the second member 62A relative to the steering axis 56, arrow T shows the direction of the torque applied by the belt 12 to the carriage 70.

FIGS. 4 and 5 each illustrate an embodiment which is capable of steering the belt 12 when the belt 12 is forced to either side of the steering roller 14. In addition, these figures also illustrate that these embodiments are effective when the belt 12 is transported in either direction by the transporting mechanism 16. This can be important for systems which require the belt 12 to reverse directions.

The first and second members 61, 61A, 62, 62A can be made of a relatively high friction material or include a high friction material on the surface which contacts the belt 12. Examples of such a material is black electrical tape (made by 3M Company, St. Paul, Minn.) and Tygon-brand tubing F-4040-A (made by Norton Performance Plastics Corporation, Akron, Ohio).

In FIGS. 1–4, a carriage 70 is shown supporting the steering roller 14 and the first and second members 61, 62 allowing the steering roller 14 and the first and second members 61 to pivot on the steering axis 56. The carriage 70 is shown in FIGS. 1–4 as including a carriage first end member 72, carriage second member 74, carriage center member 76, and a carriage pin 78. The carriage pin 78 having a longitudinal axis about which it can rotate, the longitudinal axis being the steering axis 56.

Flat springs 80 are shown in FIGS. 1–4 being attached to the carriage 70 and being biased against extending members 82 which extend from a support block 84. The flat springs 80 resist the pivoting of the carriage 70 and the steering roller 14 around the steering axis 56, and can restore the carriage 70 to a particular position on the steering axis 56. Other pivot resisting means, such as other spring types, could be employed in place of the flat springs 80.

The support block 84 can be attached and stationary relative to the larger apparatus (not shown) of which the apparatus 10 is a part. A journal bearing 86 is located at the approximate center of the support block 84. The journal bearing 86 constrains the carriage pin 78, but allows the carriage pin 78 to rotate about the steering axis 56 and translate axially on the steering axis 56. The combination of a radial bearing (not shown) and a linear bearing (not shown) could be used in place of the journal bearing.

The steering roller 14 can be configured to spin freely (or spin with relatively little friction) about the roller axis 54. The first member 61 and the second member 62 can be configured to be non-rotating about the roller axis 54 (by being, for example, attached to the dead shaft with a set screw). Or, the first and second member 61, 62 can be configured to spin with significantly more resistance than the steering roller 14. Consequently, the first and second members 61, 62 apply greater friction to the belt 12 when contacting the belt 12 than is applied by the freely rotating steering roller 14.

As a result, when the belt 12 walks laterally over the steering roller 14, for example, such that the first belt edge 22 extends beyond the first roller end 50 and contacts the first member 61 the belt 12 will drag on the first member 61 and apply a frictional force to the first member 61. Due to the position of first member 61 relative to the steering axis 56 and due to the direction of the frictional force on the first member 61, the belt 12 applies a pivoting torque to the carriage 70 about the steering axis. When the pivoting torque applied by the belt 12 to the carriage 70 is sufficiently large, the cartage 70 and the steering roller 14 will pivot about the steering axis 56 (in a counterclockwise direction about the steering axis 56 from the perspective provided by FIG. 4 when the belt 12 is transported in a clockwise direction from the perspective provided in FIG. 1). Based on this belt direction and from the perspective provided by FIG. 4, the first roller end 50 will be pivoted downwardly relative to the second roller end 52.

A sufficiently large pivoting torque would be a torque which is sufficient to overcome anything which resists pivoting, including the torque due to the flat springs 80 and the resistance of the belt 12 to stretch (i.e., belt modulus). The sufficiently large pivoting torque will cause the carriage 70 to continue to pivot until the sufficiently large pivoting torque is exceeded by the resistance of the flat springs 80 and the stretch resistance of the belt 12 (and any other pivot resistance).

When pivoted and misaligned relative to the other rollers contacting the belt inner surface, the steering roller 14 applies an uneven force or a steering force against the belt 12 in a direction opposite to the walking direction. The magnitude of the steering force is related to the degree to which the steering roller 14 is pivoted. The belt 12 will continue to walk laterally until the steering force overcomes the walking force (i.e., the force which caused the belt 12 to walk, for example, the force resulting from belt non-squareness, roller misalignment, and/or uneven nip pressure).

If the walking force continues to be applied to the belt 12, the carriage 70 and the steering roller 14 will come to a stable pivotal position on the steering axis 56 where the steering force balances with the walking force. Because the walking force may not be constant, the stable pivotal position may also not be constant. Consequently, the steering roller 14 may occasionally or continually adjust to counter the walking force.

The previous paragraphs refer to movement of the belt 12 toward the first member 61 (like that shown in FIG. 4). However, the same result is brought about when the belt 12 makes sufficient contact with the second member 62 (as is shown in FIG. 5). The belt 12 will drag on the second member 62 causing the second member 62 to move downwardly relative to the first member 61 causing the steering roller 14 to pivot (in a clockwise direction from the perspective provided by FIG. 4). The steering roller 14 will pivot to a stable pivotal position similarly to that described above.

For the steering roller 14 to steer the belt 12, the belt 12 must be under sufficient tension. The apparatus 10 provides means for applying the adequate tension to the belt 12 and means for balancing the tension across the width of the belt 12 even when the steering roller 12 is pivoted from its neutral position. This tension-balancing means also compensates for roller misalignment and belt non-squareness.

The tension-balancing means can include a coil spring 88 which is shown positioned around the pin second end 90 (the pin first end 92 adjacent to the carriage center member 76) and compressed between a face of a tension-adjusting disc 94 and a tension-releasing cam 96. The tension-releasing cam 96 is rotatable about a cam pin 98 from a tension-engaging position to a tension-releasing position. This enables a user to quickly engage or release the tension applied by the coil spring 88. A washer 100 is shown between the tension-releasing cam 96 and the coil spring 88.

The tension-adjusting disc is internally threaded and mated to an externally threaded portion of the pin second end 90. The tension-adjusting disc 94 can be rotated around the pin second end 90 to compress the coil spring 88 to set the tensioning force. The coil spring 88 biases the carriage pin 78 toward the steering roller 14 with a tensioning force proportional to the degree to which the coil spring 88 is compressed.

The pin first end 92 is shown connected to a carriage coupling member 102 which is positioned around a portion of the carriage center member 76. Aligned holes through both the carriage coupling member 102 and the carriage center member 76 allow a coupling pin 104 to join the carriage coupling member 102 to the carriage center member 76. The diameter of the coupling pin 104 can be such that it is pressfit within the hole in the carriage coupling member 102. But, the diameter of the coupling pin 104 can be such that carriage center member 76 (and the steering roller 14) can rotate about the axis of the carriage coupling pin 104, that axis being the tensioning axis 57.

As a result of this ability to rotate about the tension-balancing axis 57, the steering roller 14 can pivot in a horizontal plane (per FIG. 1-4) when the steering roller pivots in the vertical plane about the steering axis 56. Consequently, the tensioning force created by the coil spring 88 is balanced across the width of the steering roller 14.

In addition to contributing to the tension-balancing effect, the coil spring 88 contributes to the pivot-resisting effect. When the belt 12 drags on the first or second member 61, 62 and causes the steering roller 14 to pivot on the steering axis 56, the coil spring 88 is compressed further. As the coil spring 88 is compressed further, the coil spring 88 has a greater potential energy and applies a greater force to the carriage 70 increasing the tension within the belt 12 (which increases the potential energy). Consequently, the coil spring 88 should be considered another means for resisting pivoting of the steering roller 12 about the steering axis 56.

Figure 6:
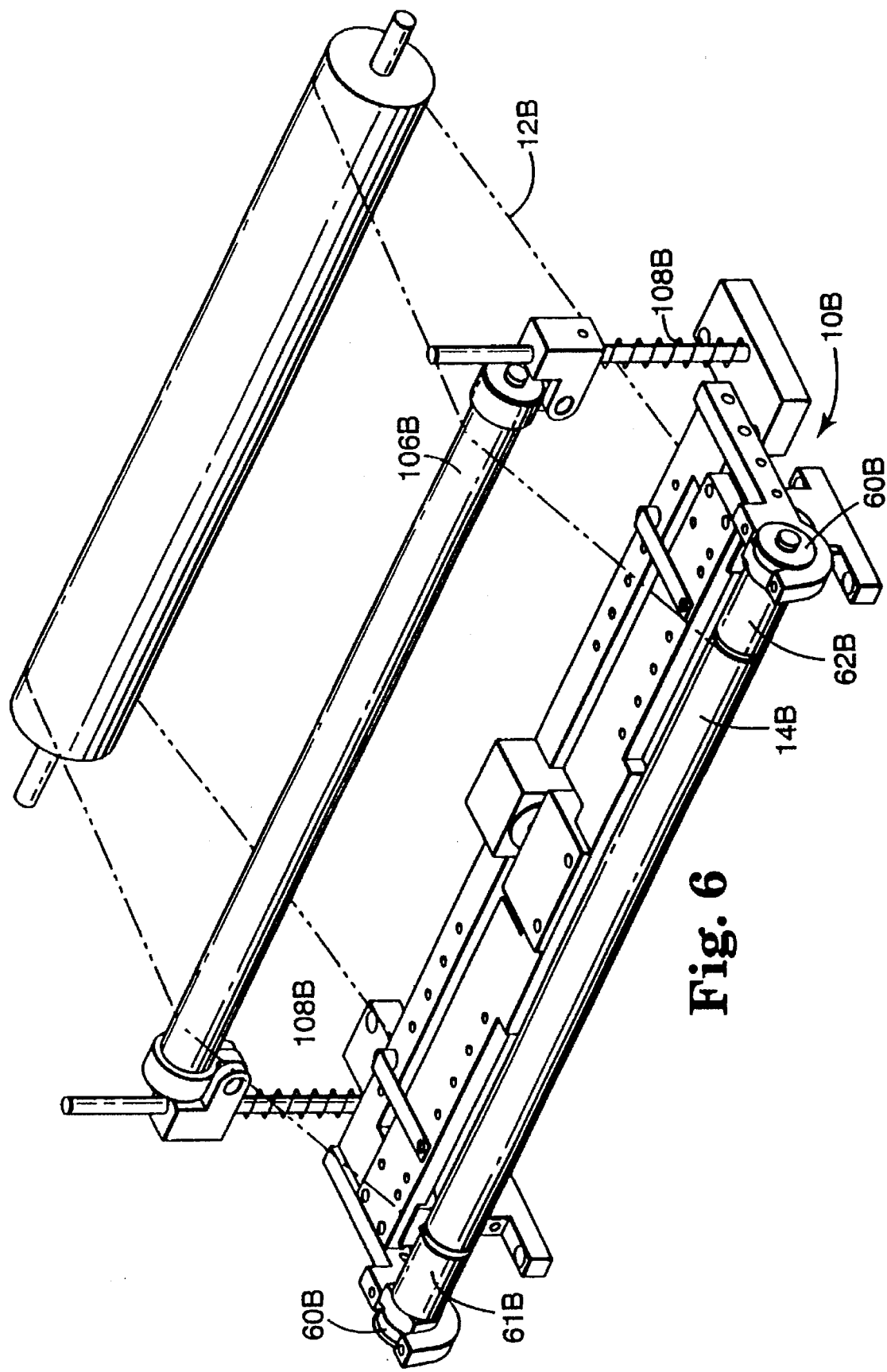
FIG. 6 is an isometric view of another embodiment of a belt transporting mechanism including another embodiment of the steering apparatus shown in FIGS. 1–4.

FIG. 6 illustrates another embodiment in which the steering ability and the tensioning ability are split into two rollers rather than relying only on the steering roller 14B. In this embodiment, the steering roller 14B has the ability to pivot about the belt steering axis 56B. A tension roller 106B adjacent to the steering roller 14B includes two ends which can be independently biased against the belt 12B to maintain tension across the belt 12B even when the steering roller 14B pivots about the steering axis 56B. Coil tension springs 108B are shown biasing the tension roller 106B against the belt 12B.

Many other configurations of the apparatus 10 are envisioned to provide similar results. For example and as previously mentioned, the apparatus 10 can be used in a unilateral steering capacity. That is, the belt 12 could intentionally be driven to one side of the steering roller 14 by canting an adjacent roller (such as one of the stabilizing roller 28 shown in FIG. 1). This would require the steering apparatus 10 to steer the belt 12 only in one direction, which can be a means for simplifying the steering apparatus 10. In addition, the belt-tensioning means could include, for example, an air-cylinder rather than or in addition to the coil spring. The air-cylinder could also be used in place of the tensioning-release cam. Accordingly, many other variations fall within the scope of this invention.

We claim:

1. An apparatus useful for maintaining an endless belt within a lateral target belt position range while the endless belt is transported by a transporting mechanism, the endless belt having a belt inner surface and a first belt edge, the apparatus comprising:

a steering roller contacting the belt inner surface, the steering roller having a first roller end;

carriage means for supporting the steering roller, the carriage means being pivotable about a steering axis such that the steering roller is pivotable about the steering axis;

a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis, the first member being configured such that first torque is sufficient to cause the steering roller to pivot around the steering axis; and pivot-resisting means for resisting the pivoting of the steering roller about the steering axis, the pivot-resisting means being functionally connected to the carriage means.

2. An apparatus useful for maintaining an endless belt within a lateral target belt position range while the endless belt is transported by a transporting mechanism, the endless belt having a belt inner surface and a first belt edge, the apparatus comprising:

a steering roller contacting the belt inner surface, the steering roller having a first roller end;

carriage means for supporting the steering roller, the carriage means being pivotable about a steering axis such that the steering roller is pivotable about the steering axis; and a first member positioned adjacent to the first roller end and functionally connected to the carriage means, the first member being cylindrical and non-rotating, the first member contacting the belt inner surface when the first belt edge extends sufficiently beyond the first roller end, the first member applying greater friction to the endless belt than the steering roller when the belt contacts the first member, and the first member being positioned relative to the steering axis such that contact between the first member and the belt causes the first member to apply a first torque to the carriage means about the steering axis.

3. An apparatus useful for maintaining an endless belt within a lateral target belt position range while the endless belt is transported by a transporting mechanism, the endless belt having a belt inner surface and a first belt edge, the apparatus comprising:

a steering roller contacting the belt inner surface, the steering roller having a first roller end and comprising at least one steering cylindrical collar which is rotatable about a stationary shaft;

carriage means for supporting the steering roller, the carriage means being pivotable about a steering axis such that the steering roller is pivotable about the steering axis; and a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, and the first member being positioned relative to the steering axis such that contact between the first member and the belt causes the first member to apply a first torque to the carriage means about the steering axis.

4. The apparatus of claim 3, the steering roller comprising between two and six steering cylindrical collars.

5. An apparatus useful for maintaining an endless belt within a lateral target belt position range while the endless belt is transported by a transporting mechanism, the endless belt having a belt inner surface and a first belt edge, the apparatus comprising:

a steering roller contacting the belt inner surface, the steering roller being cylindrical and having a first outer diameter and a first roller end;

carriage means for supporting the steering roller, the carriage means being pivotable about a steering axis such that the steering roller is pivotable about the steering axis; and a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis, the first member being generally frustoconical and having a first member first end and a first member second end, the first member first end being adjacent to the first roller end and having a second outer diameter, the first member second end having a third outer diameter, the second outer diameter being no larger than the first outer diameter, the third outer diameter being larger than the first outer diameter.

6. An apparatus useful for maintaining an endless belt within a lateral target belt position range while the endless belt is transported by a transporting mechanism, the endless belt having a belt inner surface and a first belt edge, the apparatus comprising:

a steering roller contacting the belt inner surface, the steering roller having a first roller end, the steering roller being rotatable about a roller axis;

carriage means for supporting the steering roller, the carriage means being pivotable about a steering axis such that the steering roller is pivotable about the steering axis, the steering axis not intersecting the roller axis; and a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis.

7. An apparatus useful for maintaining an endless belt within a lateral target belt position range while the endless belt is transported by a transporting mechanism, the endless belt having a belt inner surface and a first belt edge, the apparatus comprising:

a steering roller contacting the belt inner surface, the steering roller having a first roller end and a second roller end;

carriage means for supporting the steering roller, the carriage means being pivotable about a steering axis such that the steering roller is pivotable about the steering axis, the carriage means comprising:

a carriage first end member functionally connected to the first roller end;

a carriage second end member functionally connected to the second roller end;

a carriage center member functionally connected to the carriage first and second end members; and a carriage pin having a first pin end, the first pin end being functionally connected to the carriage center member, the carriage pin having a pin longitudinal axis which is the steering axis, the carriage pin being rotatable about the pin longitudinal axis such that the steering roller and the carriage means are rotatable about the steering axis;

a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis; and pivot-resisting means for resisting the pivoting of the steering roller about the steering axis.

8. The apparatus of claim 7, the support block being stationary, the pivot-resisting means comprising at least one flat spring, the at least one flat spring having a first spring end and a second spring end, the first spring end being functionally connected to one of the first and the second carriage end members, the second spring end being positioned to contact the support block and resist the pivoting of the steering roller about the steering axis.

9. The apparatus of claim 8, the at least one flat spring comprising a first flat spring and a second flat spring, the first flat spring being functionally connected to the first carriage end member, and the second flat spring being functionally connected to the second carriage end member.

10. The apparatus of claim 7, the pivot-resisting means comprising a coil spring positioned around a portion of the carriage pin.

11. An apparatus useful for maintaining an endless belt within a lateral target belt position range while the endless belt is transported by a transporting mechanism, the endless belt having a belt inner surface, a first belt edge, and a belt width, the apparatus comprising:

a steering roller contacting the belt inner surface, the steering roller having a first roller end and a second roller end;

carriage means for supporting the steering roller, the carriage means being pivotable about a steering axis such that the steering roller is pivotable about the steering axis, the carriage means comprising:

a carriage first end member functionally connected to the first roller end;

a carriage second end member functionally connected to the second roller end;

a carriage center member functionally connected to the carriage first and second end members; and a carriage pin having a first pin end, the first pin end being functionally connected to the carriage center member, the carriage pin having a pin longitudinal axis which is the steering axis, the carriage pin being rotatable about the pin longitudinal axis such that the steering roller and the carriage means are rotatable about the steering axis;

a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis;

a belt-tensioning means for causing the steering roller to apply a tensioning force against the belt inner surface; and a tension-balancing means for allowing the belt-tensioning means to balance the tensioning force across the belt width.

12. The apparatus of claim 11, the carriage pin having a second pin end, the second pin being threaded, the belt tensioning means comprising:

a compression spring positioned around the second pin end and having a first spring end; and a tension adjustment disc having a spring face and a threaded inner surface, the spring face contacting the first spring end, the threaded inner surface mating with and being rotatable about the pin second end, the rotation of the tension adjustment disc in a first rotating direction compresses the compression spring and increases the tension applied by the steering roller to the endless belt.

13. The apparatus of claim 12, the compression spring having a second spring end, the belt tensioning means further comprising a tension release cam operatively coupled to the second spring end, the tension release cam being rotatable about a cam axis from an tension-engaging position and a tension-releasing position.

14. The apparatus of claim 13, the belt forming a belt loop within which the steering roller, the carriage means, the belt-tensioning means, and the tension-balancing means are positioned.

15. The apparatus of claim 11, the carriage center member having a coupling hole, the tension balancing means comprising:
 a carriage coupling member connected to the pin first end and positioned around a portion of the carriage center member; and
 a carriage coupling pin connected to the carriage coupling and passing through the carriage coupling hole, the coupling pin and the carriage coupling hole sharing a tension-balancing axis about which the carriage center member and the steering roller are rotatable.

16. The apparatus of claim 15, the tension-balancing axis being perpendicular to the roller axis and to the steering axis, the tension-balancing axis intersecting the steering axis, the tension-balancing axis not intersecting the roller axis.

17. An apparatus useful for maintaining an endless belt within a lateral target belt position range while the endless belt is transported by a transporting mechanism, the endless belt having a belt inner surface and a first belt edge, the apparatus comprising:
 a steering roller contacting the belt inner surface, the steering roller having a first roller end;
 carriage means for supporting the steering roller, the carriage means being pivotable about a steering axis such that the steering roller is pivotable about the steering axis;
 a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis; and
 pivot-resisting means for resisting the pivoting of the steering roller about the steering axis.

18. An apparatus useful for maintaining an endless belt within a lateral target belt position range while the endless belt is transported by a transporting mechanism, the endless belt having a belt width, a belt inner surface, and a first belt edge, the apparatus comprising:
 a steering roller contacting the belt inner surface, the steering roller having a first roller end;
 carriage means for supporting the steering roller, the carriage means being pivotable about a steering axis such that the steering roller is pivotable about the steering axis;
 a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis;
 a belt tensioning means for causing the steering roller to apply a tensioning force against the belt inner surface; and
 a tension balancing means for allowing the belt tensioning means to balance the tensioning force across the belt width.

19. An apparatus useful for maintaining an endless belt within a lateral target belt position range while the endless belt is transported by a transporting mechanism, the endless belt having a belt inner surface and a first belt edge, the apparatus comprising:
 a steering roller contacting the belt inner surface, the steering roller having a first roller end;
 carriage means for supporting the steering roller, the carriage means being pivotable about a steering axis such that the steering roller is pivotable about the steering axis;
 a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis; and
 a tension roller positioned adjacent to the steering roller, the tension roller applying a tensioning force to the belt inner surface.

20. An electrophotographic system, comprising:
 an endless belt having a first belt edge, a belt inner surface, and a belt outer surface, the belt outer surface comprising a photoreceptive substrate;
 a charging system for charging the photoreceptive substrate;
 an exposure system for exposing the photoreceptive substrate to at least one image-wise pattern of radiation which creates at least one electrostatic image on the photoreceptive substrate;
 a development system for developing the at least one electrostatic image to an at least one toned image;
 a transfer system for transferring the toned image to a receptor; and
 a belt-steering system for steering the belt, comprising:
  a steering roller contacting the belt inner surface, the steering roller having a first roller end;
  carriage means for supporting the steering roller, the carriage means being pivotable about a steering axis such that the steering roller is pivotable about the steering axis;
  a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis; and a tension roller positioned adjacent to the steering roller, the tension roller applying a tensioning force to the belt inner surface.

21. An apparatus useful for maintaining an endless belt within a lateral target belt position range while the endless belt is transported by a transporting mechanism and while an image is imposed on the belt by an imaging station, the endless belt having a belt inner surface and a first belt edge, the apparatus comprising:

a steering roller contacting the belt inner surface, the steering roller having a first roller end;

carriage means for supporting the steering roller, the carriage means being pivotable about a steering axis such that the steering roller is pivotable about the steering axis;

a first member positioned adjacent to the first roller end and functionally connected to the carriage means, the first member contacting the belt inner surface when the first belt edge extends sufficiently beyond the first roller end, the first member applying greater friction to the endless belt than the steering roller when the belt contacts the first member, the first member being positioned relative to the steering axis such that contact between the first member and the belt causes the first member to apply a first torque to the carriage means about the steering axis; and a stabilizing roller contacting the endless belt and positioned between the steering roller and the imaging station to create a span of the belt which forms a plane, the plane being substantially unaffected by pivoting movement of the steering roller.

22. A method useful for steering an endless belt toward a lateral target belt position while the endless belt is transported by a transporting mechanism, the endless belt having a belt inner surface and a first belt edge, the method comprising the steps of:

providing a steering roller contacting the belt inner surface, the steering roller having a first roller end, the steering roller being rotatable about a roller axis;

providing carriage means for supporting the steering roller, the carriage means being pivotable about a steering axis and allowing the steering roller to be pivotable about the steering axis;

providing a first member positioned adjacent to the first roller end and functionally connected to the carriage means, the first member contacting the belt inner surface when the first belt edge extends sufficiently beyond the first roller end, the first member applying greater friction to the endless belt than the steering roller when contacting the endless belt causing the endless belt to apply a first torque to the carriage means about the steering axis;

transporting the endless belt in a first direction; and transporting the endless belt in a second direction opposite the first direction.

* * * * *